(12) United States Patent
Ruiz Avilés et al.

(10) Patent No.: US 12,526,651 B2
(45) Date of Patent: Jan. 13, 2026

(54) CELL SIMILARITY INDICATOR BASED ON COVERAGE AREA MORPHOLOGY

(71) Applicant: Telefonaktiebolaget LM Ericsson (publ), Stockholm (SE)

(72) Inventors: José María Ruiz Avilés, Málaga (ES); Paulo Antonio Moreira Mijares, Málaga (ES); Juan Ramiro Moreno, Málaga (ES); Adriano Mendo Mateo, Málaga (ES); Jose Outes Carnero, Torremolinos (ES); Yak Ng Molina, Málaga (ES)

(73) Assignee: TELEFONAKTIEBOLAGET LM ERICSON (PUBL), Stockholm (SE)

( * ) Notice: Subject to any disclaimer, the term of this patent is extended or adjusted under 35 U.S.C. 154(b) by 312 days.

(21) Appl. No.: 18/034,192

(22) PCT Filed: Apr. 15, 2021

(86) PCT No.: PCT/IB2021/053135
§ 371 (c)(1),
(2) Date: Apr. 27, 2023

(87) PCT Pub. No.: WO2022/090810
PCT Pub. Date: May 5, 2022

(65) Prior Publication Data
US 2023/0403575 A1    Dec. 14, 2023

(30) Foreign Application Priority Data
Oct. 30, 2020  (EP) ..................................... 20382948

(51) Int. Cl.
H04W 24/02    (2009.01)
H04W 24/08    (2009.01)

(52) U.S. Cl.
CPC ........... *H04W 24/02* (2013.01); *H04W 24/08* (2013.01)

(58) Field of Classification Search
None
See application file for complete search history.

(56) References Cited

U.S. PATENT DOCUMENTS 11,407,327  B1    8/2022   Kohn et al.
2002/0145981  A1   10/2002   Klinker et al.
(Continued)

FOREIGN PATENT DOCUMENTS

CN    101873605 B      3/2013
WO    2012072445 A1    6/2012
(Continued)

OTHER PUBLICATIONS

"Cosine Distancecosine Similarityangular Cosine Distanceangular Cosine Similarity" NIST, 2017 (Year: 2017).*
(Continued)

*Primary Examiner* — Jay L Vogel
(74) *Attorney, Agent, or Firm* — COATS & BENNETT, PLLC

(57) ABSTRACT

A method (50) and apparatus (60) for quantifying similarities between first and second cells (12a, 12b) in a mobile communications network (10) is provided. In particular, for each of the first cell and the second cell, a network node (60) receives input parameters, and based on those parameters, determines (54) respective sets of features for the cell. Each respective set of features defines a cell configuration and a coverage area morphology for the cell. So determined, a level of similarity between the first and second cells can be determined (56) based on their respective sets of features.

18 Claims, 5 Drawing Sheets

(56) References Cited

U.S. PATENT DOCUMENTS

| | | | | |
|---|---|---|---|---|
| 2012/0040696 | A1* | 2/2012 | Siomina | G01S 5/0268 |
| | | | | 455/456.6 |
| 2012/0207022 | A1 | 8/2012 | Grayson et al. | |
| 2012/0287784 | A1 | 11/2012 | Shatzkamer et al. | |
| 2013/0080607 | A1 | 3/2013 | Raleigh | |
| 2013/0122885 | A1 | 5/2013 | Kojima | |
| 2013/0232267 | A1 | 9/2013 | Shatzkamer et al. | |
| 2013/0285855 | A1* | 10/2013 | Dupray | H04W 4/021 |
| | | | | 342/451 |
| 2014/0040975 | A1 | 2/2014 | Raleigh et al. | |
| 2014/0219104 | A1 | 8/2014 | Senarath et al. | |
| 2015/0112767 | A1 | 4/2015 | Shatzkamer et al. | |
| 2015/0370232 | A1 | 12/2015 | Kohn et al. | |
| 2017/0329289 | A1 | 11/2017 | Kohn et al. | |
| 2019/0014488 | A1 | 1/2019 | Tan et al. | |
| 2019/0239238 | A1 | 8/2019 | Calabrese et al. | |
| 2019/0259097 | A1 | 8/2019 | Raleigh et al. | |
| 2020/0145299 | A1 | 5/2020 | Do et al. | |
| 2021/0374161 | A1* | 12/2021 | Marvaniya | G06F 16/29 |

FOREIGN PATENT DOCUMENTS

| | | |
|---|---|---|
| WO | 2019139510 A1 | 7/2019 |
| WO | 2020119372 A1 | 6/2020 |
| WO | 2021190772 A1 | 9/2021 |
| WO | 2022042891 A1 | 3/2022 |

OTHER PUBLICATIONS

"Discovering Attackers Past Behavior to Generate Online Hyper-Alerts" Kawakani, 2017 (Year: 2017).*

Buenestado, V. et al. "Self-tuning of Remote Electrical Tilts Based on Call Traces for Coverage and Capacity Optimization in LTE", IEEE Transactions on Vehicular Technology, vol. 66, No. 5, May 2017, pp. 4315-4326, IEEE.

Razavi, R. et al., "Self-Optimization of Capacity and Coverage in LTE Networks Using a Fuzzy Reinforcement Learning Approach", 21st Annual IEEE International Symposium on Personal, Indoor and Mobile Radio Communications, Sep. 26-30, 2010, pp. 1865-1870, IEEE.

Guo, W. et al., "Spectral- and Energy-Efficient Antenna Tilting in a HetNet using Reinforcement Learning", 2013 IEEE Wirless Communications and Networking Conference (WCNC): MAC, Apr. 7-10, 2013, pp. 767-772, IEEE.

Sutton, R. et al., "Reinforcement Learning: An Introduction", Second edition, in progress, 2014, pp. 1-352, MIT Press.

Aumayr, E. et al., "Probabilistic Knowledge-Graph based Workflow Recommender for Network Management Automation", 2019 IEEE 20th International Symposium on "A World of Wireless, Mobile and Multimedia Networks" (WoWMoM), Jun. 10-12, 2019, pp. 1-7, IEEE.

Balevi, E. et al., "Online Antenna Tuning in Heterogeneous Cellular Networks With Deep Reinforcement Learning", IEEE Transactions on Cognitive Communications and Networking, vol. 5, No. 4, Dec. 2019, pp. 1113-1124, IEEE.

Mismar, F. et al., "A Framework for Automated Cellular Network Tuning with Reinforcement Learning", arXiv:1808.05140v5 [cs.NI], Jul. 18, 2019, pp. 1-32, arXiv.

Shah, T., "State Aware Principal Action Space Embedding for Centralized MARL", Autonomous Systems, Apr. 2021, pp. 1-8.

Lee, D. et al., "Optimization for Reinforcement Learning: From a single agent to cooperative agents", IEEE Signal Processing Magazine, May 2020, pp. 123-135, IEEE.

Wikipedia, "Reinforcement learning", pp. 1-13, retrieved on Feb. 15, 2023, retrieved from Internet: https://en.wikipedia.org/wiki/Reinforcement_learning.

Muñoz, P. et al., "Fuzzy Rule-Based Reinforcement Learning for Load Balancing Techniques in Enterprise LTE Femtocells", IEEE Transactions on Vehicular Technology, vol. 62, No. 5, Jun. 2013, pp. 1962-1973, IEEE.

Ramiro, J. et al., "Self-Organizing Networks: Self-Planning, Self-Optimization and Self-Healing for GSM, UMTS, and LTE", Dec. 2011, pp. 1-309, Wiley.

Han, J. et al. "Data Mining Concepts and Techniques", 3rd Edition, Jul. 2011, pp. 1-740, Elsevier.

Sun, F. et al., "Cell cluster-based dynamic TDD DL/UL reconfiguration in TD-LTE systems", IEEE Wireless Communications and Networking Conference (WCNC 2016)—Track 3—Mobile and Wireless Networks, Apr. 3-6, 2016, pp. 1-5, IEEE.

Cheng, M. et al., "Adaptive Adjustment of TDD Uplink-downlink Configuration based on Cluster Classification in Beyond LTE Heterogeneous Networks", Proceedings of the 2017 IEEE International Conference on Applied System Innovation (IEEE-ICASI 2017—Meen, Prior & Lam (Eds)), May 13-17, 2017, pp. 1312-1315, IEEE.

Pasquino, N et al., "A comparative approach of unsupervised machine learning techniques for LTE network parameter clustering", 2020 IEEE International Instrumentation and Measurement Technology Conference (I2MTC), May 25-28, 2020, pp. 1-6, IEEE.

Ouyang, Y et al., "Application Behaviors Driven Self-Organizing Network (SON) for 4G Lte Networks" IEEE Transactions on Network Science and Engineering, vol. 7 No. 1, January - Mar. 2020, pp. 3-13, IEEE.

* cited by examiner

CELL SIMILARITY INDICATOR BASED ON COVERAGE AREA MORPHOLOGY

TECHNICAL FIELD

The present disclosure relates generally to cells in communications networks, and more particularly to determining how similar pairs of cells are based on the similarity of the configurations of the cells and on the morphology between the coverage areas of the cells.

BACKGROUND

Cellular networks are generally very complex systems. The cells of a mobile communications network can be analyzed to determine how similar they may be to one another. Recognizing cells with similar performance, for example, can provide valuable information that can be used for various purposes. Most conventional approaches, however, determine cell similarity using classification or clustering algorithms. Particularly, such algorithms use a set of specific cell features in order to group cells having similar characteristics into clusters. Depending on which cell features are used, the resultant clusters contain cells with similar performance, issues, or other characteristics. The following list identifies documents that detail these conventional approaches.

Y. Ouyang, Z. Li, L. Su, W. Lu and Z. Lin, "Application Behaviors Driven Self-Organizing Network (SON) for 4G LTE Networks," in IEEE Transactions on Network Science and Engineering, vol. 7, no. 1, pp. 3-14, 1 Jan.-Mar. 2020, doi: 10.1109/TNSE.2018.2877353.

F. Sun and Y. Zhao, "Cell cluster-based dynamic TDD DL/UL reconfiguration in TD-LTE systems," 2016 IEEE Wireless Communications and Networking Conference, Doha, 2016, pp. 1-5, doi: 10.1109/WCNC.2016.7565057.

N. Pasquino, S. Zinno, F. Cotugno and S. Petrocelli, "A comparative approach of unsupervised machine learning techniques for LTE network parameter clustering," 2020 IEEE International Instrumentation and Measurement Technology Conference (I2MTC), Dubrovnik, Croatia, 2020, pp. 1-6, doi: 10.1109/I2MTC43012.2020.9129223.

M. Cheng, Y. Wang, W. Hwang, Y. Wu and C. Lin, "Adaptive adjustment of TDD uplink-downlink configuration based on cluster classification in Beyond LTE Heterogeneous networks," 2017 International Conference on Applied System Innovation (ICASI), Sapporo, 2017, pp. 1312-1315, doi: 10.1109/ICASI.2017.7988142.

WO2019233635A1, "Methods, apparatus and computer-readable mediums relating to detection of cell conditions in a wireless cellular network".

Although the conventional approaches are widely used, they are focused on different use cases and are limited in both functionality and usefulness. For example, as stated above, conventional approaches classify or cluster cells having similar characteristics into groups. However, none of the known solutions quantify a similarity between the analyzed cells. Additionally, by focusing on cell performance indicators, cell issues, or other similar characteristics, the applicability of the results of conventional approaches are limited. For example, while a first set of cell characteristics or features may be useful for grouping some cells into clusters, it may not be applicable for use in analyzing other cells that are not affected by this first set of cell characteristics.

SUMMARY

Embodiments of the present disclosure provide a technique for measuring and quantifying the similarity of a "morphology" between the coverage areas of pairs of network cells, and using the results to address network-related issues for which such cell similarity is important.

In one aspect, the present disclosure provides a method for quantifying similarities between first and second cells in a mobile communications network. The method is characterized in that it comprises, for each of the first cell and the second cell, determining respective sets of features defining a cell configuration and a coverage area morphology for the cell, and determining a level of similarity between the first and second cells based on their respective sets of features.

Additionally, in one aspect, the present disclosure provides a network node for quantifying similarities between first and second cells in a mobile communications network. In this aspect, the network node comprises communications interface circuitry and processing circuitry. The communications interface circuitry is configured to communicate information with one or more cells in the mobile communications network. The processing circuitry is operatively connected to the communications interface circuitry, and is configured to, for each of the first cell and the second cell, determine respective sets of features defining a cell configuration and a coverage area morphology for the cell, and determine a level of similarity between the first and second cells based on the respective sets set of features for the first and second cells.

Further, in one aspect, the present disclosure provides a non-transitory computer-readable medium storing computer program code thereon that, when executed by processing circuitry of a network node configured to quantify similarities between first and second cells in a mobile communications network, causes the network node to, for each of the first cell and the second cell, determine respective sets of features defining a cell configuration and a coverage area morphology for the cell, and determine a level of similarity between the first and second cells based on the respective sets set of features for the first and second cells.

DETAILED DESCRIPTION

Figure 1:
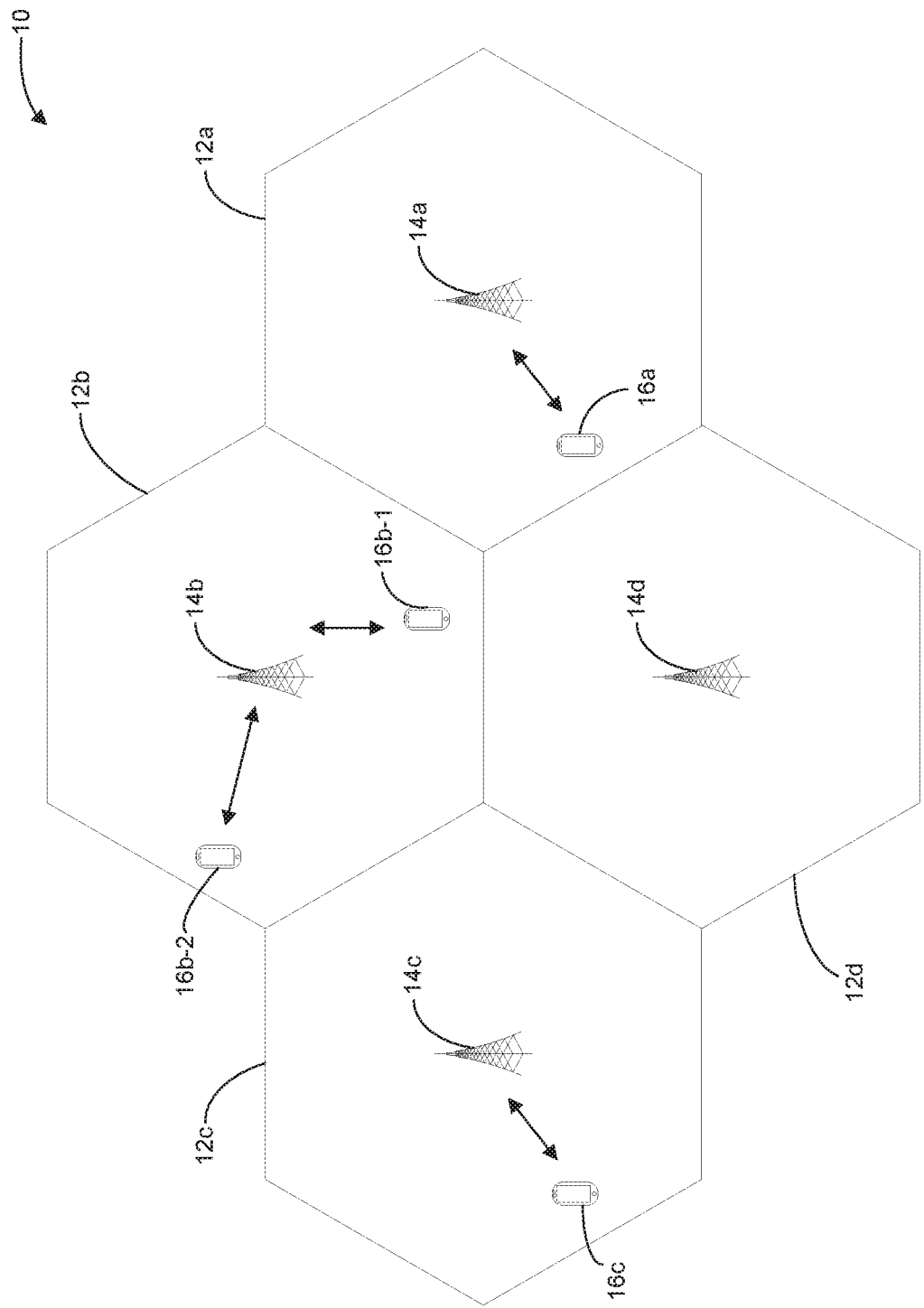
FIG. 1 illustrates an exemplary communication network according to an embodiment of the present disclosure.

Recognizing the similarities that may exist between two (or more) network cells can be valuable. As described in more detail later, such information is beneficial and can be used for a variety of different purposes. There are conventional solutions in place that determine the similarities between two cells; however, these existing solutions are limited in both their functionality and usefulness.

The present disclosure, therefore, provides a method and corresponding apparatus that addresses these issues. In particular, embodiments of the present disclosure measure and quantify the similarity of a "morphology" between the coverage areas of pairs of network cells. "Morphology," in the context of this disclosure, is defined as the structure or form of the various features with a network cell. Such features include not only man-made structures that exist within a cell (e.g., buildings, bridges, roads, etc.), but also any topographical features (e.g., hills, valleys, mountains, bodies of water etc.) and/or vegetation (e.g., trees, bushes, etc.) that are present within the cell. The results of the quantification are utilized by the present embodiments to address network-related issues for which such cell similarity is important.

In more detail, the present embodiments provide a method for calculating the similarity between two cells in a mobile network based on the morphology of their coverage areas. That is, based on the different "clutter types" across the entire coverage area (e.g., vegetation, buildings, bridges, roads, seas, lakes, rivers, etc.), the terrain elevation across the coverage area, and the physical configuration of those cells (e.g., antenna tilt, antenna transmit power, etc.).

In at least one embodiment of the present disclosure, a cosine similarity approach is used to calculate the similarities between a pair of cells. The details of this approach are provided in "Data Mining (Third edition)", 2012, chapter 2.4.7 authored by Jiwei Han, Micheline Kambar, and Jian Pei, which is incorporated herein by reference in its entirety. According to this approach, a set of features is calculated for every cell. The set of features is then transformed into vectors and used to calculate a "similarity coefficient" that indicates a level of similarity between a pair of cells.

Any features needed or desired can be used by the present embodiments to determine the similarity coefficient. However, in at least one embodiment, the set of features for each pair of cells includes:

a) The cell and antenna parameters;
b) The clutter information for the coverage area of the cells.
c) The terrain elevation information of the area around the cells.

In this aspect, the coverage area of the cells is represented by a first set of pixels. Each pixel in the first set of pixels has a value representing the type of terrain in the coverage area at that pixel. Similarly, the terrain elevation information is represented by a second group of pixels. The value of each pixel in the second set of pixels represents the terrain elevation in the coverage area at that pixel. Advantageously, one embodiment of the present disclosure also includes building maps to improve the characterization of the cell coverage area.

It should be noted that the features used to determine the cell similarities are based on information that is typically provided by a network operator, who generally has access to an antenna database for the antenna configuration information, as well as clutter type and elevation maps of their networks. However, in another embodiment, such information may be provided by a network-based control node that is configured to obtain such information from each cell and provide the information to whichever entity is performing the similarity calculations.

Similarly, the present embodiments utilize the cosine similarity approach in order to calculate the cell similarities. However, those of ordinary skill in the art should readily appreciate that this is merely for illustrative purposes and that the present disclosure is not so limited. It is possible, in other embodiments, to replace the cosine similarity approach with one or more different, more robust or sophisticated functions.

Referring now to the drawings, an exemplary embodiment of the disclosure will be described in the context of a 5G or NR wireless communication network. Those skilled in the art will appreciate, however, that the methods and apparatus herein described are not limited to use in 5G or NR networks. Rather, they may also be used in wireless communication networks where multiple beams within a single cell may be used for communication with wireless devices in the cell, as well as in a network using any Radio Access Network (RAN) technology including, but not limited to, WiFi, 2G, 3G, 4G, and beyond 5G.

FIG. 1 illustrates a wireless communication network 10 according to the NR standard currently being developed by Third Generation Partnership Project (3GPP). As seen in FIG. 1, wireless communication network 10 comprises one or more cells 12a, 12b, 12c, 12d (collectively, "cells 12"). Each cell 12 has one or more base stations (BSs) 14a, 14b, 14c, 14d (collectively, "BS 14") that serves one or more mobile devices such as User Equipment (UE) 16a, 16b-1, 16b-2, 16c (collectively, "UE 16"). The BSs 14 seen in FIG. 1 are also referred to as Evolved NodesBs (eNBs) and Fifth Generation (5G) NodeBs (gNBs) in 3GPP standards. Although only four cells 14 and four corresponding BSs 14 are shown in FIG. 1, those of ordinary skill in the art will readily appreciate that typical wireless communication networks 10 comprise more than four such cells 12 and more than four BSs 14.

The UEs 16 seen in FIG. 1 are mobile devices (e.g., smart phones) carried by the users. However, this is for illustrative purposes only. UEs 16 may comprise any type of equipment capable of communicating with BS 14 over a wireless communication channel. For example, the UEs 16 may comprise cellular telephones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Figure 2:
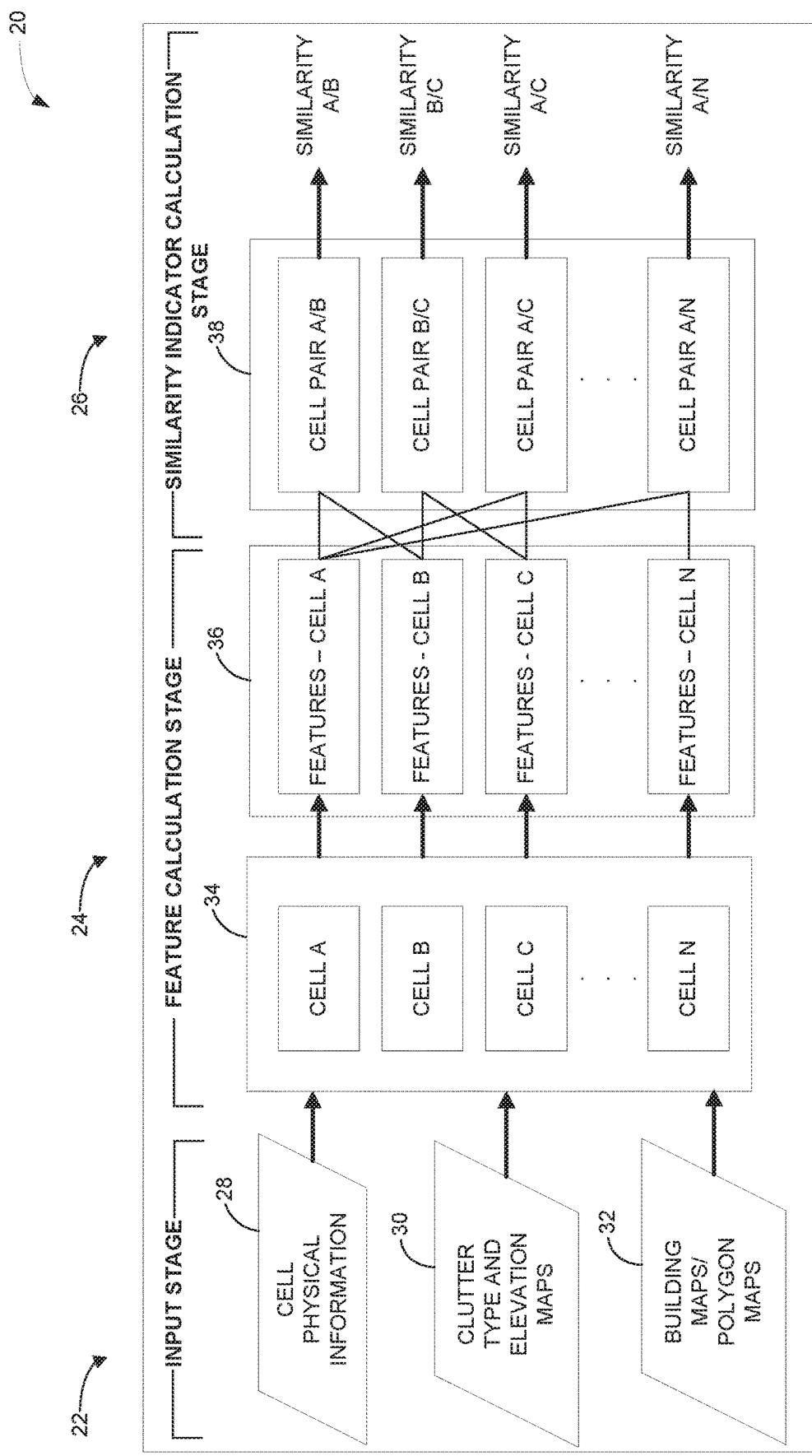
FIG. 2 is a functional block diagram illustrating the process by which cell-related information is analyzed and used to determine pairs of cells having a similar cell configuration and coverage area morphology according to one embodiment of the present disclosure.

FIG. 2 is a functional block diagram illustrating a process 20 by which cell-related information is analyzed and used to determine pairs of cells (e.g., 12a, 12b) having a similar cell configuration and coverage area morphologies according to one embodiment of the present disclosure. Particularly, to obtain an indicator that quantifies the similarity between the cells, the present embodiments calculate a set of features for each cell based on a received set of input data. The calculated set of features are then used to calculate the similarity indicator indicating the similarity between every pair of cells 12.

In more detail, process 20 is a multi-stage process comprising an input stage 22, a feature calculation stage 24, and a similarity indicator stage 26.

Input Stage

In the input stage 22, the data that is used to calculate the cell features is provided to the feature calculation stage 24. This data includes, but may not be limited to, the cell physical information 28, the clutter type and elevation maps 30, and the building/polygon maps 32. As stated above, a network operator, who generally has access to one or more databases for the antenna configuration information, the clutter type and elevation information for their networks, and the building/polygon information, will provide the input data 28, 30, 32. However, in another embodiment, such information may be provided by a network-based control node that is configured to obtain such information from each cell and provide the information to whichever entity is performing the similarity calculations.

The cell physical information 28 is provided for each cell 12 and includes, but is not limited to, one or more of the following data values.

The cell ID;
The latitude of the antenna;
The longitude of the antenna;
The altitude of the antenna relative to a ground surface;
The azimuth of the antenna;
The mechanical tilt of the antenna;
The electrical tilt of the antenna;
The altitude of the antenna relative to sea level;
The transmit power of the antenna;
The vertical beamwidth of the antenna;
The horizontal beamwidth of the antenna;
The number of transmission antennas;
The reference signal power boost; and
The Downlink (DL) Evolved Universal Terrestrial Radio Access Absolute Radio Frequency Channel Number (EARFCN).

Those of ordinary skill in the art should readily appreciate that these input data values are illustrative only, and that other parameter values are also possible. For example, in one embodiment, the cell physical information 28 also includes parameter values (e.g., those related to antenna gain) that impact signal propagation. Other cell physical information, and/or other input sources (e.g., cell neighbor information, signal strength measurements, etc.) could be also provided as part of the input data during input stage 22.

Feature Calculation Stage

The clutter type and elevation maps 30 comprise both a clutter type map and an elevation map. The clutter type map comprises information that defines the type of terrain in the coverage area of the cell. By way of example only, such information may include, but is not limited to, topographical features (e.g., hills, valleys, mountains, bodies of water etc.) and/or vegetation (e.g., trees, bushes, etc.) that are present within the coverage area of the cell. In one embodiment, the information in the clutter map type is discretized into a finite set of categories for each of one or more locations in the coverage area with a defined spatial resolution.

The elevation map defines the elevation of the terrain relative to sea level at one or more locations in the coverage area with a defined spatial resolution. Such information may include values indicating the elevation of the topographical features within the coverage area of the cell (e.g., hills, valleys, mountains, bodies of water etc.).

The building maps/polygon maps comprise information that define certain characteristics of one or more buildings and/or other man-made structures (e.g., bridges, etc.) positioned within or near the coverage area that could impact signal propagation. For example, such maps could include parameter values indicating the physical dimensions for a man-made structure such as a building or bridge, the construction materials for the structure, and the like. Regardless of the particular type of map, however, the information contained in these maps helps to increase the characterization capacity of the RF environment covered by the cell.

The feature calculation stage 24, as stated above, uses the data provided during the input stage 22 to calculate groups of features for each cell 12. In this embodiment, two groups of features 34, 36 are calculated.

The first group of features 34 comprises the physical configuration parameters for the antenna(s) and/or cell. Such features include, but are not limited to, one or more of:

The mechanical tilt of the antenna (i.e., the vertical orientation of the antenna in degrees);
The electrical tilt of the antenna (i.e., a angular shift in elevation of the direction of maximum gain of the antenna by a specific electrical design of the antenna);
The horizontal beamwidth of the antenna (i.e., a maximum horizontal width against the antenna reference horizontal direction);
The vertical beamwidth of the antenna (i.e., a maximum vertical width against the antenna reference vertical direction).
The height of the antenna relative to an underlying ground surface (i.e., a total height of the antenna over the underlying ground surface);
The antenna transmit power (i.e., a maximum transmission power at an antenna reference point);
The number of transmission antennas (i.e., a number of antenna ports used in downlink (DL) transmissions);
The reference signal power boost (i.e., g a power boost of the cell specific reference signal in dB);
The DL Bandwidth (i.e., the total amount of frequency spectrum in Hz); and
The DL EARFCN (i.e., the E-UTRA Absolute Radio Frequency Channel Number).

The second group of features 36 comprises the features describing the morphology of the coverage area for the cell 12. Within the context of this disclosure, the coverage area of a given cell is defined as an arc of circumference in which:
the center of the arc is the antenna location;
the radius of the arc is a setting (e.g., 1 Km); and
the angle of the arc is equal to double of the antenna horizontal beamwidth.

As above, the second group of features 36 may comprise any data needed or desired. However, in one embodiment, the second group of features 36 comprises information such as:

Antenna Clutter Array [1 . . . N] (i.e., the clutter of the pixel in which the antenna is located represented as a 1-hot encoding array). That is, the value n of this feature will be:
1 if the clutter type of the antenna is n; and
0 if the value is different from n;
Clutter [1 . . . N] (i.e., the percentage of pixels of each type of clutter in the coverage area of the cell). That is, for a given bin or element n in the Antenna Clutter Array, the corresponding array element is the percentage of the cell coverage area where the clutter type is n relative to the entire coverage area;
Average elevation (i.e., the average elevation in the coverage area relative to the elevation at the antenna location—e.g., average elevation in the coverage area minus the elevation of the antenna at the antenna location);
10th elevation percentile (i.e., the 10th percentile of the elevation in the coverage area relative to the elevation at the antenna location—e.g., the elevation in the coverage area minus the elevation at the antenna location);

50th elevation percentile (i.e., the 50th percentile of the elevation in the coverage area relative to the elevation at the antenna location—e.g., the elevation in the coverage area minus the elevation at the antenna location);

90th elevation percentile (i.e., the 90th percentile of the elevation in the coverage area relative to the elevation at the antenna location—e.g., the elevation in the coverage area minus the elevation at the antenna location);

The average distance to the N closest cells (i.e., the average distance between a target cell and the N closest cells in the network having the same DL EARFCN); and The number of cells in the same site (i.e., the number of cells that belong to the same site of the target cell with the same DL EARFCN).

It should be noted here that the list of features 34, 36 is not intended to be a fixed/static or exhaustive list for use in every cell similarity calculation. This is because the level of similarity between two cells 12 may depend on what type of analysis needs to be performed. For example, consider a situation where a feature indicator (e.g., an indicator indicating a distance to the closest neighbor cells) represents a noise level to be considered when determining a similarity level between two cells 12. Such information may not be valuable (or usable) in cases where an algorithm for determining the morphology similarity between two cells is not affected by the noise (or other characteristics) of neighbor cell(s). In another situation, a parameter indicating the distance to the closest cells could be an important input, and thus, is a good indicator of similarity. In these situations, such inputs are useful to the algorithm determining the similarity and is therefore included in the calculations used to determine the similarities between two cells.

Additionally, other features may be derived from the input data, and thus, may be included provided those features are useful for a particular situation. Thus, while the present embodiments are focused on creating a way to measure cell similarity, the level of similarity between two cells may depend on the type of situation.

Similarity Indicator Calculation Stage

This embodiment of the present embodiments utilizes a cosine similarity matrix to mathematically compute the similarity indicators that indicate the morphological similarities between two cells. In particular, cosine similarity is a metric used to determine how similar two entities are. Mathematically, the cosine similarity metric measures the cosine of an angle between two vectors projected in a multi-dimensional space, and solves the following product between all vectors:

$$\cos\theta = \frac{\vec{a} \cdot \vec{b}}{\|a\| \|b\|} = \frac{\sum_{1}^{n} a_i b_i}{\sqrt{\sum_{1}^{n} a_i^2} \sqrt{\sum_{1}^{n} b_i^2}} \quad (1)$$

where: $\vec{a} \cdot \vec{b} = \sum_{1}^{n} a_i b_i = a_1 b_1 + a_2 b_2 + \cdots + a_n b_n$ is a dot product of the two vectors $\vec{a}$ $\vec{b}$ represented by two pair of cells and every component of the vector is represented by the number of features 34, 36 provided in the feature calculation stage 34.

As a result of above equation, an m-by-n design matrix (where m and n are every pair of cells identified in the dataset) is obtained providing a similarity indicator value ranging from −1 to 1. Specifically, in this embodiment, a value of '1' may indicate that a pair of given cells (e.g., cell 12a, 12b) are 100% similar to each other in a first direction. A value of "0," on the other hand, may represent 0% similarity (orthogonality) between the two cells. A value of "−1" may indicate that the two cells are 100% dissimilar to each other in a second direction (e.g., opposite to the first).

Regardless of the particular values, however, the values calculated according to Equation 1 are used to populate a similarity matrix where, for every pair of cells present in a dataset, a similarity indicator 38 against every other cell is provided.

$$\begin{bmatrix} x_{c1,c1} & x_{c1,c2} & \cdots & x_{c1,cn} \\ x_{c2,c1} & x_{c2,c2} & \cdots & x_{c2,cn} \\ \cdots & \cdots & \cdots & \cdots \\ x_{cn,c1} & x_{cn,c2} & \cdots & x_{cn,cn} \end{bmatrix} \quad (2)$$

where $x_{ci,cj}$ is a similarity indicator indicating the level of similarity between a $cell_i$ and a $cell_j$.

Additionally, some embodiments of the present disclosure are further configured to obtain a ranking of cells that are similar to one or more particular cells based on the similarities of those cells. To accomplish this, embodiments of the present disclosure perform a post processing technique on the similarity matrix to sort the list of cells by their similarity indicator. Thus, not only do the present embodiments determine which pairs of cells are similar, it also is able to rank those cell pairs based on that level of similarity. This allows for network operators to focus on a subset of similar cells (e.g., those having the highest similarity values indicating the highest level of similarity).

For illustrative purposes, the present embodiments described to this point measure the similarity between two different network elements (i.e., pairs of network cells 12) based on the configuration and morphology characteristics that are not associated with any performance or service characteristics. Regardless, however, the techniques for determining the morphological similarities between two cells as provided herein is a valuable tool that may be utilized in conjunction with other type of algorithms or methodologies for determining cell similarities.

Applications

There are various applications for the determined cell similarities according to the present embodiments. Some of these applications are described below.

Using Cell Similarity to Train Models for Signal Strength Prediction

In one example, the similarity indicators determined according to the present disclosure may be used to train a model at the cell level with the signal strength measurements of that cell to predict the signal strength in regions of the cell where the signal strength is unknown. Such capabilities are very advantageous and not possible using conventional methods. Particularly, there are usually a relevant amount of situations in which cells have an insignificant amount of signal strength measurements. This lack of information directly impacts the level of accuracy of the models for those cells. In extreme cases, it is not possible to train a given model because there are no signal strength measurements (or too few signals strength measurements) with which to train the model.

Figure 3:
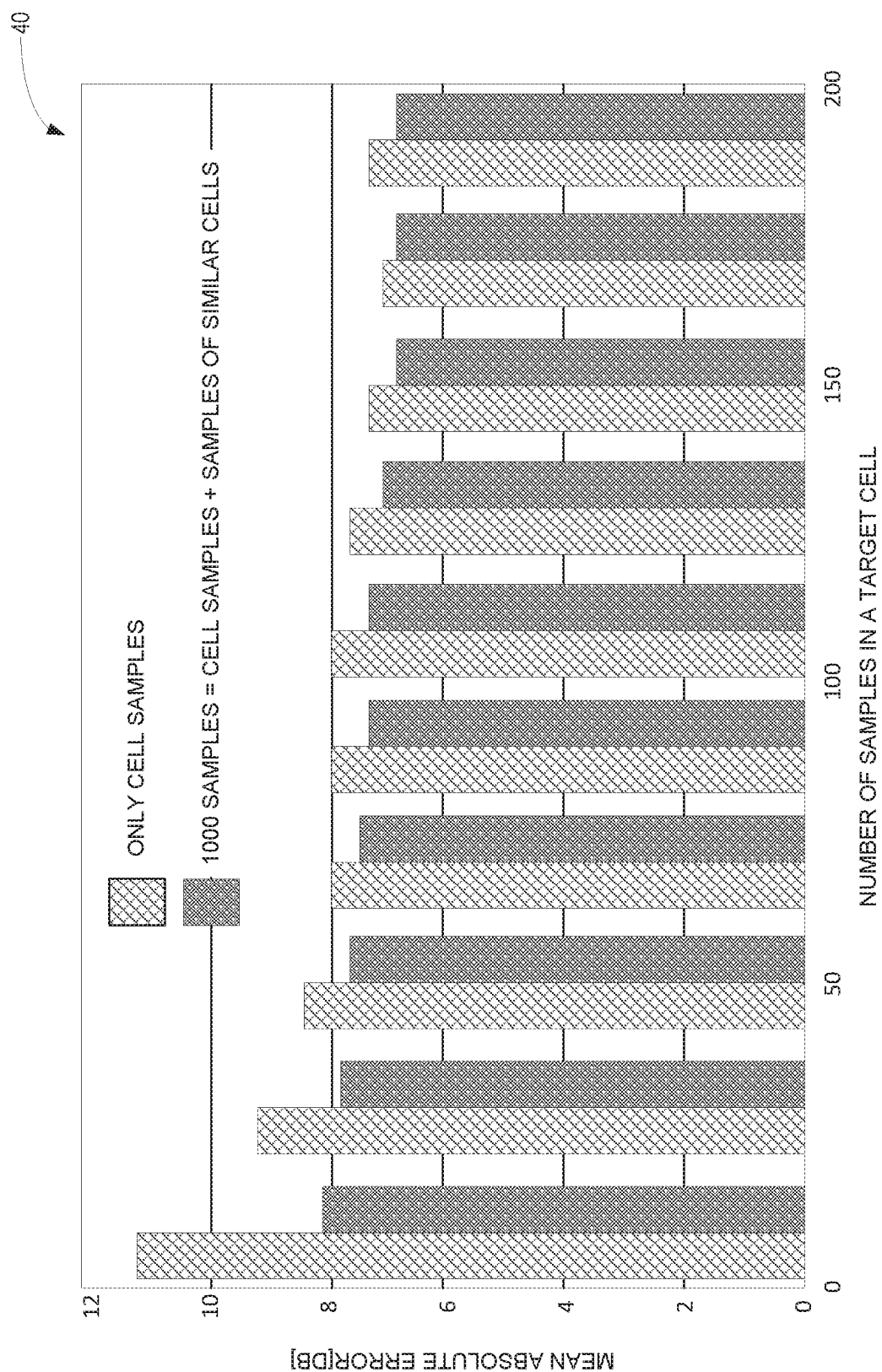
FIG. 3 is a graph illustrating a signal strength prediction error improvement based on quantifying the similarities between pairs of cells in a communications network according to one embodiment of the present disclosure.

However, by applying the cell similarity technique of the present embodiments over an entire area of interest (e.g., one or more pairs of similar cells), a sufficient amount of signal strength measurements from the other similar cells can be determined and used to increase the number of samples used in training a signal strength prediction model for cells that lack such measurements. FIG. 3 illustrates a graph 40 graphically illustrating the results of such an experiment.

Results

A signal strength prediction experiment was executed using 10,449 cells, resulting in the creation of more than 800,000 pixels representing the clutter and terrain information for the cells. As seen in FIG. 3, two approaches were utilized to measure the impact of determining the similarity in the morphology between pairs of cells on the accuracy of the predictions.

Only cell samples: With this approach, for each cell, a respective machine learning model was trained using only samples of that cell. No samples from other, similar cells were utilized to train the model.

1000 Samples=Cell Samples+Samples of similar cells: With this approach, for each cell, a respective machine learning model was trained using samples of that cell and samples of other cells having a similar morphology. To select samples from the similar cells, embodiments of the present disclosure calculated a similarity indicator between a given cell and the rest of cells in the network, and then sorted the cells according to the similarity indicator. Then, samples from the sorted cells were selected based on the ordering of the cells until a complete 1000 samples were obtained and used to train the model.

FIG. 3 illustrates the Mean Absolute Error of the predictions (i.e., the y-axis) as depending on a number of samples in the given or "target" cell (i.e., the x-axis). The Mean Absolute Error is defined as:

$$MeanAbsoluteError = \frac{\sum_{i=1}^{N} |\hat{x}_i - x_i|}{N} \quad (3)$$

where $\hat{x}_i$ and $x_i$ are the predicted and the real values, respectively, for each sample i.

As can be observed, present embodiments improve the accuracy for all the cells. Moreover, the improvement in accuracy is higher than 2 dB when the number of samples in the target cell were too low (i.e., the "Only Cell Samples" approach in which model training was performed using only the samples from the target cell). Additionally, the Mean Absolute Error is 7.6 dB for the Only Cell Samples approach, and 6.9 dB for the "Cell Samples+Samples of Similar Cells" approach (i.e. training set of 1000 samples making use of samples from similar cells), which means an average improvement of 0.7 dB (i.e., a relative improvement of 10% in a logarithm scale or 25% in a linear scale).

Thus, in cases where too few samples are available to conduct robust training, using the present embodiments increase the number of samples in the training set, and thus, improve the accuracy of the signal strength prediction. Even in extreme cases were a cell had no samples at all, highly accurate predictions were generated using the present embodiments with a Mean Absolute Error of 8.38 dB. This is a very low number when compared to those of conventional techniques.

Greenfield Configuration

In addition to the application above, embodiments of the present disclosure can be applied over a Greenfield Design or Roll-Out activities. Cell similarity is an alternative and new way to estimate or predict the best setup for a new cell based on similar cells that are already deployed and in service. This is because the present embodiments determine the cell similarity based on the cell configuration and the morphology of the area to be covered (e.g., the coverage area of the cell), and do not depend on the cell being in service or even existing.

Optimization Based on Similarity

Similarly, the present embodiments can also be applied to optimization activities. In these applications, the calculated cell similarity indicator can be an alternative way of predicting a level of impact of optimization changes on a given cell by comparing the differences, such as active Radio Access Network (RAN) features, Remote Electrical Tilt (RET) setups, and the like, on pairs of cells.

Measuring Cell Similarity

Accordingly, the present embodiments provide an innovative technique for measuring the similarity between two cells based only on cell configuration and coverage terrain morphology. As such, the present embodiments provide benefits and advantages that conventional methods do not or cannot provide. Among such benefits and advantages are:

The input data (e.g., 28, 30, 32 seen in FIG. 2) are generalized and do not depend on a complex interface, such as cell trace, performance management etc. This makes the methods of the present disclosure very easy to use and apply.

The definitions of the previously described features allows for synthesizing all information available in the cell information database and in the clutter and elevation maps, thereby producing a very valuable indicator of similarity between cells based on the morphology of their coverage area and their configuration.

The use of the cosine similarity method, as previously described, facilitates quantifying the similarity between cells using the defined features as input.

The application of the similarity greatly improves the accuracy of ML models for signal strength prediction. This demonstrates the potential of the methodology of the present disclosure when used together with other types of solutions or network tasks, such as network planning and optimization.

Figure 4:
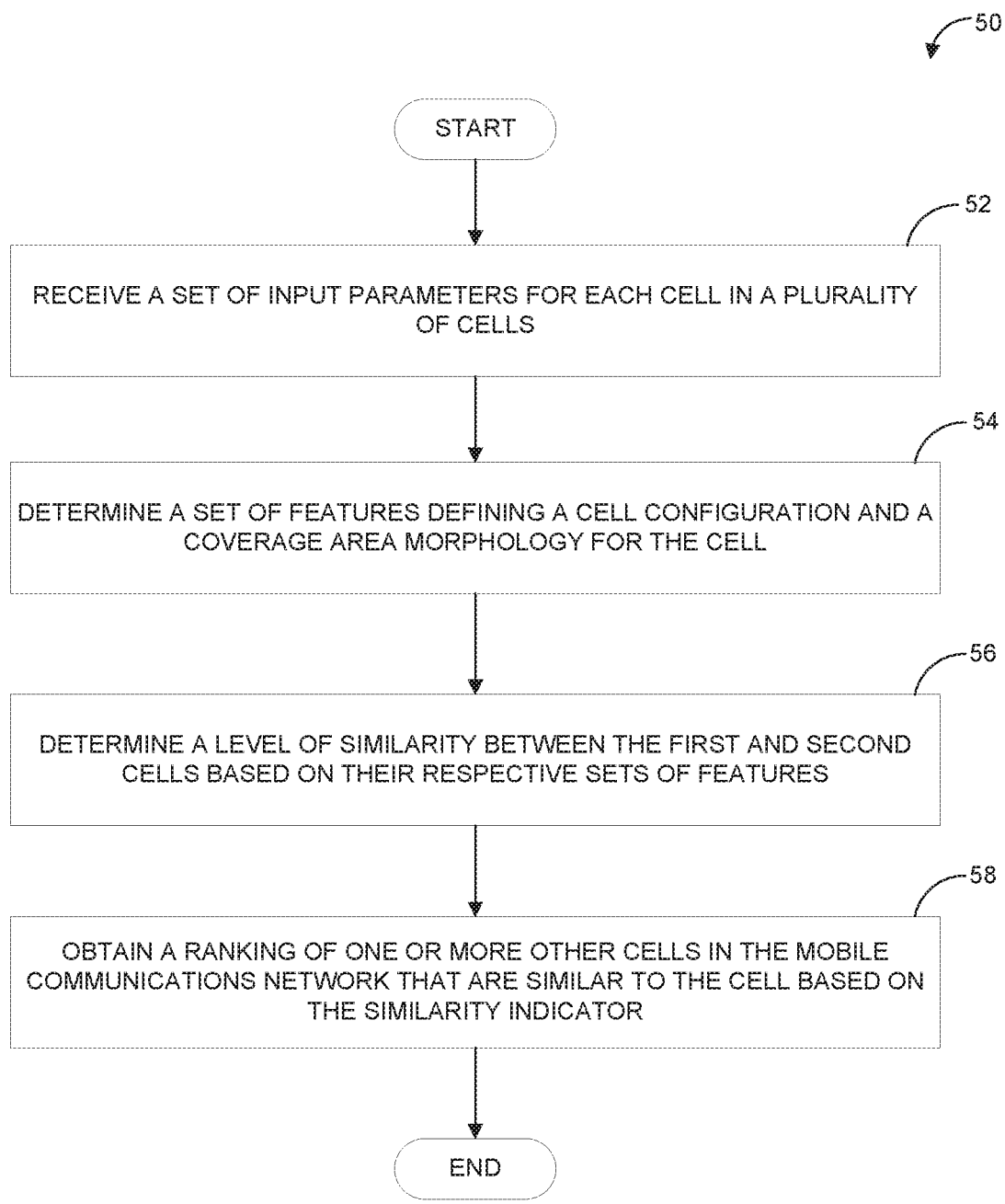
FIG. 4 is a flow diagram illustrating a method for quantifying the similarities between pairs of cells in a communications network according to one embodiment of the present disclosure.

FIG. 4 is a flow diagram illustrating a method 50 for quantifying the similarities between pairs of cells 12 in a communications network 10 according to one embodiment of the present disclosure. As seen in FIG. 4, method 50, which is implemented by a network node, calls for receiving a set of input parameters for each cell in a plurality of cells during the input sage 22 (box 52). As previously described, the input parameters may comprise cell-specific physical information 28, clutter type and elevation maps 30, and in at least some embodiments, building/polygon maps 32. The input data may be provided by a network operator, who has access to such information, and/or a network-based control node.

Then, during the feature calculation stage 24, method 50 calls for determining, based on the input data, respective sets of features defining a cell configuration and a coverage area morphology for the cell (box 54). As stated above, one embodiment of the present disclosure calculates 2 groups of features for each cell 12. The first group of features 34 comprises the physical configuration parameters for the antenna(s) and/or cell 12. The second group of features 36 comprises the features describing the morphology of the coverage area for the cell 12.

Next, method 50 calls for determining a level of similarity between the first and second cells based on their respective sets of features that were calculated during the feature calculation stage 24 (box 56). In one embodiment, such calculations are accomplished using Equation (1), and the results used to populate the similarity matrix (2), as previously described.

Once levels of similarities have been determined for the cells, method 50 calls for applying those results. Particularly, in one embodiment, method 50 calls for obtaining a ranking of one or more other cells in the network that are deemed to have a similar morphology than a cell of interest (box 58). Such a ranking allows for the present embodiments to determine which other cells are most similar to another cell, and apply the results of the similarity calculations in a meaningful way. For example, as detailed above, determining a ranking of the cells according to their morphology similarity allows for a more accurate optimization of network parameters when brining a cell on-line, as well as for a more accurate prediction of cell characteristics, such as signal strength.

In some embodiments, the set of input parameters comprises one or more of:
  a cell ID for the cell;
  a latitude of an antenna associated with the cell;
  a longitude of the antenna;
  an altitude of the antenna over an underlying surface;
  an azimuth of the antenna;
  a mechanical tilt of the antenna;
  an electrical tilt of the antenna;
  an altitude of the antenna relative to sea level;
  a transmit power of the antenna;
  a vertical beamwidth of the antenna;
  a horizontal beamwidth of the antenna;
  a number of transmission antennas at the cell
  a reference signal power boost; and
  a Downlink (DL) Evolved Universal Terrestrial Radio Access Absolute Radio Frequency Channel Number (EARFCN).

In some embodiments, the set of input parameters comprises a clutter type map defining a type of terrain of the coverage area of the cell at each of one or more first locations, and an elevation map defining an elevation of the terrain of the coverage area of the cell at each of one or more second locations relative to seal level.

In some embodiments, for each of the first and second cells, the set of features defining the cell configuration of the cell comprises cell and antenna parameters. In such cases:
  the cell parameters comprise one or more of:
    the reference signal power boost;
    a DL bandwidth; and
    the DL EARFCN; and
  the antenna parameters comprise one or more of:
    the mechanical tilt of the antenna;
    the electrical tilt of the antenna;
    the vertical beamwidth of the antenna;
    the horizontal beamwidth of the antenna;
    an antenna height relative to an underlying surface;
    the transmit power of the antenna; and
    the number of transmission antennas.

In some embodiments, for each of the first and second cells, the set of features defining the coverage area morphology of the cell comprises clutter information for an area around the cell, wherein the clutter information comprises a first set of one or more pixels, and wherein each pixel in the first set of pixels indicates a type of terrain at a location in the area around the cell, and terrain elevation information for the area around the cell, wherein the terrain elevation information comprises a second set of one or more pixels, and wherein each pixel in the second set of pixels indicates an elevation of the terrain at a location in the area around the cell.

In some embodiments, the clutter information comprises an antenna clutter parameter defining a clutter of the pixel in which the antenna is located and a clutter value defining a percentage of pixels of each type of clutter in the coverage area of the cell. Additionally, the terrain elevation information comprises an average elevation parameter defining the average elevation of the coverage area minus the elevation of the antenna, a 10th percentile elevation parameter defining the 10th percentile of the elevations in the coverage area minus the elevation in the antenna location, a $50^{th}$ percentile elevation parameter defining the 50th percentile of the elevations in the coverage area minus the elevation in the antenna location, a $90^{th}$ percentile elevation parameter defining the 90th percentile of the elevations in the coverage area minus the elevation in the antenna location, an average distance from the cell to the N closest cells in the network and having a same DL EARFCN, where N>=1, and a number of other cells that belong to a same site as the cell and having the same DL EARFCN.

In some embodiments, determining a level of similarity between the first and second cells based on the set of features for the first cell and the set of features for the second cell comprises determining a similarity matrix indicating how similar the first and second cells are to each other.

In some embodiments, the similarity matrix comprises a cosine similarity matrix calculated using:

$$\cos\theta = \frac{\vec{a} \cdot \vec{b}}{\|a\| \, \|b\|} = \frac{\sum_{1}^{n} a_i b_i}{\sqrt{\sum_{1}^{n} a_i^2} \sqrt{\sum_{1}^{n} b_i^2}}$$

where: $\vec{a} \cdot \vec{b}_i = \sum_{1}^{n} a_i b_i = a_1 b_1 + a_2 b_2 + \cdots + a_n b_n$ is a dot product of the two vectors $\vec{a}$ $\vec{b}$.

In some embodiments, the similarity matrix is:

$$\begin{bmatrix} x_{c1,c1} & x_{c1,c2} & \cdots & x_{c1,cn} \\ x_{c2,c1} & x_{c2,c2} & \cdots & x_{c2,cn} \\ \cdots & \cdots & \cdots & \cdots \\ x_{cn,c1} & x_{cn,c2} & \cdots & x_{cn,cn} \end{bmatrix}$$

where $x_{ci,cj}$ is a similarity indicator indicating the level of similarity between a $cell_i$ and a $cell_j$.

In some embodiments, for each of the first and second cells, obtaining a rank of one or more other cells in the mobile communications network that are similar to the cell based on the similarity indicator.

In some embodiments, obtaining a ranking of similar cells comprises sorting each cell in the mobile communications network in order of its similarity indicator, and grouping one or more cells with at least one of the first and second cells based on the respective similarity indicators.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
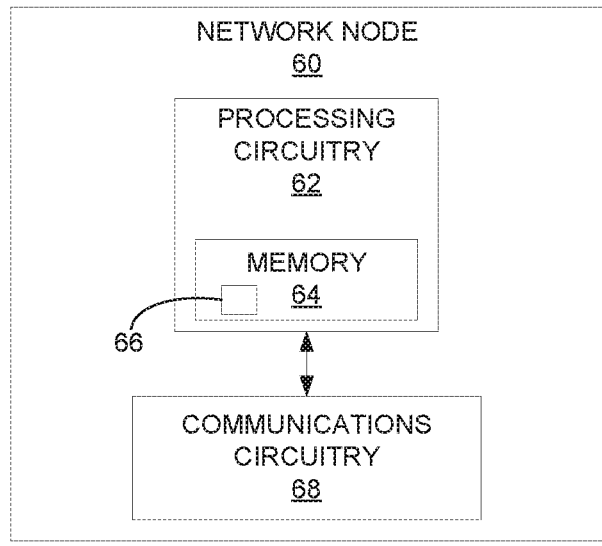
FIG. 5 is a functional block diagram illustrating some of the components of a network node configured according to embodiments of the present disclosure.

FIG. 5 is a functional block diagram illustrating some of the components of a network node 60 configured according to embodiments of the present disclosure. As seen in FIG. 5, network node 60 comprises processing circuitry 62, memory circuitry 64, and communications circuitry 68. In addition, memory circuitry 64 stores a computer program 66 that, when executed by processing circuitry 62, configures network node 60 to implement the methods herein described.

In more detail, the processing circuitry 62 controls the overall operation of network node 60 and processes the data and information it receives from other sends and receives to/from other nodes. Such processing includes, but is not limited to, receiving a respective set of input parameters for each of a plurality of cells in a network, and for each of a first cell and a second cell, determining respective sets of features defining a cell configuration and a coverage area morphology for the cell, and determining a level of similarity between the first and second cells based on their respective sets of features. In this regard, the processing circuitry 62 may comprise one or more microprocessors, hardware, firmware, or a combination thereof.

The memory circuitry 64 comprises both volatile and non-volatile memory for storing computer program code and data needed by the processing circuitry 62 for operation. Memory circuitry 64 may comprise any tangible, non-transitory computer-readable storage medium for storing data including electronic, magnetic, optical, electromagnetic, or semiconductor data storage. As stated above, memory circuitry 64 stores a computer program 66 comprising executable instructions that configure the processing circuitry 62 to implement the methods herein described. A computer program 66 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 66 for configuring the processing circuitry 62 as herein described may be stored in a removable memory, such as a portable compact disc, portable digital video disc, or other removable media. The computer program 66 may also be embodied in a carrier such as an electronic signal, optical signal, radio signal, or computer readable storage medium.

The communication circuitry 68 communicatively connects network node 60 to one or more other nodes via communications network 10, as is known in the art. In some embodiments, for example, communication circuitry 68 communicatively connects network node 60 to one or more other cells in network 10. As such, communications circuitry 68 may comprise, for example, an ETHERNET card or other circuitry configured to communicate wirelessly with the cell agents and the control element.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 6:
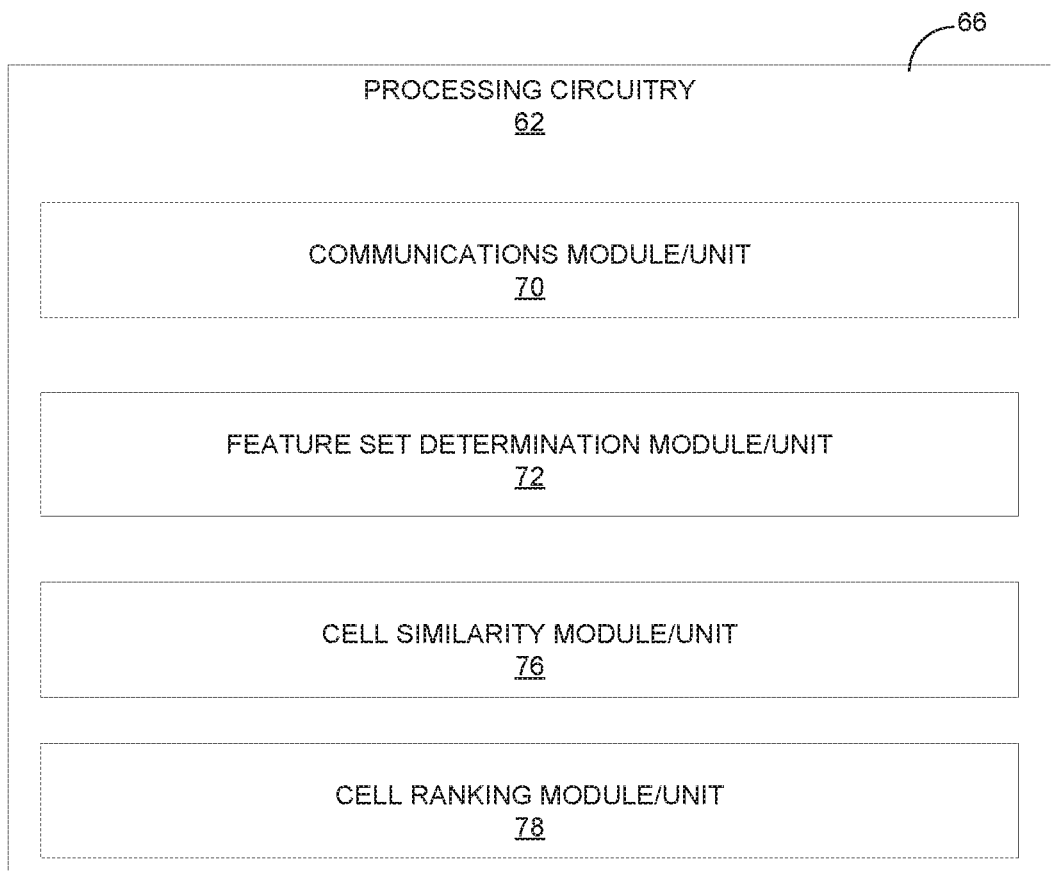
FIG. 6 is a functional block diagram illustrating a computer program product configured to quantify the similarities between pairs of cells in a communications network according to one embodiment of the present disclosure.

FIG. 6 is a functional block diagram illustrating some modules of a computer program 66 configured to quantify the similarities between pairs of cells in a communications network according to one embodiment of the present disclosure. As seen in FIG. 6, computer program 66 comprises a communications module/unit 70, a feature set determination module/unit 72, a cell similarity determination module/unit 74, and a cell ranking module/unit 78.

When computer program 66 is executed by processing circuitry 62, the communications module/unit 70 configures network node 90 to receive, from each of a plurality of network cells 12, respective input parameter values, as previously described. The feature set determination module/unit 72 configures network node 60 to determine, for each cell, respective sets of features defining a cell configuration and a coverage area morphology for the cell, as previously described. The cell similarity determination module/unit 74 configures network node 60 to determine a level of similarity between pairs of cells based on their respective sets of features, as previously described. The cell ranking module/ unit 78 configures network node 60 to obtain a ranking of the cells based the similarity indicator of each cell, as previously described.

Embodiments further include a carrier containing such a computer program 66. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The present embodiments provide benefits and advantages that conventional systems and method do not provide. For example, conventional clustering techniques simply classify cells into similar groups. However, these conventional solutions do not have a similarity indicator per cell-pair. Not only does the similarity indicator of the present embodiments quantify the level of similarity between cells, but it also indicates which cells are most similar to each other.

Additionally, the similarity indicator of the present disclosure focuses on both the morphology of the cell's coverage area and the configuration of the cells. Thus, unlike conventional approaches, the present embodiments are able to focus on the similarity calculations as they apply to specific characteristics of the cell, such as signal propagation issues, while omitting other aspects of mobile networks like traffic, interference, and the like.

Moreover, a similarity level based purely on signal propagation characteristics, for example, makes it possible to re-use historical optimization strategies that were deemed successful, as well as to re-use previous parameters values, features, and/or other aspects related to cell signal propagation with good proven results. So obtained, those accurate results can be implemented in similar cells with the same, or similar, results.

The present disclosure may also be used in conjunction with other types of approaches used to determine the similarity between cells, and applied to other techniques, such as various learning techniques.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for quantifying similarities between first and second cells in a mobile communications network, the method comprising:
   for each of the first cell and the second cell, determining respective sets of features defining a cell configuration and a coverage area morphology for the cell; and
   determining a level of similarity between the first and second cells based on their respective sets of features;
   wherein for each of the first and second cells, the set of features defining the cell configuration of the cell comprises cell and antenna parameters, wherein:
   the cell parameters comprise one or more of:
      a reference signal power boost;
      a DL bandwidth; and
      a Downlink (DL) Evolved Universal Terrestrial Radio Access Absolute Radio Frequency Channel Number (EARFCN);
   a antenna parameters comprise one or more of:
      a mechanical tilt of the antenna;
      a electrical tilt of the antenna;
      a vertical beamwidth of the antenna;
      a horizontal beamwidth of the antenna;
      an antenna height relative to an underlying surface;
      a transmit power of the antenna; and
      a number of transmission antennas; and
   wherein for each of the first and second cells, the set of features defining the coverage area morphology of the cell comprises:
      clutter information for an area around the cell, wherein the clutter information comprises a first set of one or more pixels, and wherein each pixel in the first set of pixels indicates a type of terrain at a location in the area around the cell; and
      terrain elevation information for the area around the cell, wherein the terrain elevation information comprises a second set of one or more pixels, and wherein each pixel in the second set of pixels indicates an elevation of the terrain at a location in the area around the cell.

2. The method of claim 1, further comprising:
   for each of the first and second cells:
      receiving a set of input parameters for the cell; and
      wherein the set of features for the cell are determined based on the set of input parameters for the cell.

3. The method of claim 2, wherein the set of input parameters comprises one or more of:
   a cell ID for the cell;
   a latitude of an antenna associated with the cell;
   a longitude of the antenna;
   an altitude of the antenna over an underlying surface;
   an azimuth of the antenna;
   a mechanical tilt of the antenna;

an electrical tilt of the antenna;
an altitude of the antenna relative to sea level;
a transmit power of the antenna;
a vertical beamwidth of the antenna;
a horizontal beamwidth of the antenna;
a number of transmission antennas at the cell
a reference signal power boost; and
the EARFCN.

4. The method of claim 2, wherein the set of input parameters comprises:
a clutter type map defining a type of terrain of the coverage area of the cell at each of one or more first locations; and
an elevation map defining an elevation of the terrain of the coverage area of the cell at each of one or more second locations relative to seal level.

5. The method of claim 1, wherein:
the clutter information comprises:
an antenna clutter parameter defining a clutter of the pixel in which the antenna is located;
a clutter value defining a percentage of pixels of each type of clutter in the coverage area of the cell; and
the terrain elevation information comprises:
an average elevation parameter defining the average elevation of the coverage area minus the elevation of the antenna;
a 10th percentile elevation parameter defining the 10th percentile of the elevations in the coverage area minus the elevation in an antenna location;
a 50th percentile elevation parameter defining the 50th percentile of the elevations in the coverage area minus the elevation in the antenna location;
a 90th percentile elevation parameter defining the 90th percentile of the elevations in the coverage area minus the elevation in the antenna location;
an average distance from the cell to the N closest cells in the network and having a same DL EARFCN, where N>=1; and
a number of other cells that belong to a same site as the cell and having the same DL EARFCN.

6. The method of claim 1, wherein determining a level of similarity between the first and second cells based on the set of features for the first cell and the set of features for the second cell comprises determining a similarity matrix indicating how similar the first and second cells are to each other.

7. The method of claim 6 wherein the similarity matrix comprises a cosine similarity matrix calculated using:

$$\cos \theta = \frac{\vec{a} \bullet \vec{b}}{\|a\| \|b\|} = \frac{\sum_{1}^{n} a_i b_i}{\sqrt{\sum_{1}^{n} a_i^2} \sqrt{\sum_{1}^{n} b_i^2}}$$

where: $\vec{a} \bullet \vec{b} = \sum_{1}^{n} a_i b_i = a_1 b_1 + a_2 b_2 + \cdots + a_n b_n$ is a dot product of the two vectors $\vec{a}$ $\vec{b}$.

8. The method of claim 6, wherein the similarity matrix is:

$$\begin{bmatrix} x_{c1,c1} & x_{c1,c2} & \cdots & x_{c1,cn} \\ x_{c2,c1} & x_{c2,c2} & \cdots & x_{c2,cn} \\ \cdots & \cdots & \cdots & \cdots \\ x_{cn,c1} & x_{cn,c2} & \cdots & x_{cn,cn} \end{bmatrix}$$

where $x_{ci,cj}$ is a similarity indicator indicating the level of similarity between a $cell_i$ and a $cell_j$.

9. The method of claim 8, further comprising, for each of the first and second cells, obtaining a ranking of one or more other cells in the mobile communications network that are similar to the cell based on the similarity indicator.

10. The method of claim 9, wherein obtaining a ranking of similar cells comprises:
sorting each cell in the mobile communications network in order of its similarity indicator; and
grouping one or more cells into a group comprising at least one of the first and second cells based on the respective similarity indicators.

11. A network node for quantifying similarities between first and second cells in a mobile communications network, the network node comprising:
communications interface circuitry configured to communicate information with one or more cells in the mobile communications network; and
processing circuitry operatively connected to the communications interface circuitry and configured to:
for each of the first cell and the second cell, determine respective sets of features defining a cell configuration and a coverage area morphology for the cell; and
determine a level of similarity between the first and second cells based on the respective sets set of features for the first and second cells;
wherein for each of the first and second cells, the set of features defining the cell configuration of the cell comprises cell and antenna parameters, wherein:
the cell parameters comprise one or more of:
a reference signal power boost;
a DL bandwidth; and
a Downlink (DL) Evolved Universal Terrestrial Radio Access Absolute Radio Frequency Channel Number (EARFCN); and
the antenna parameters comprise one or more of:
a mechanical tilt of the antenna;
a electrical tilt of the antenna;
a vertical beamwidth of the antenna;
a horizontal beamwidth of the antenna;
an antenna height relative to an underlying surface;
a transmit power of the antenna; and
a number of transmission antennas; and
wherein for each of the first and second cells, the set of features defining the coverage area morphology of the cell comprises:
clutter information for an area around the cell, wherein the clutter information comprises a first set of one or more pixels, and wherein each pixel in the first set of pixels indicates a type of terrain at a location in the area around the cell; and
terrain elevation information for the area around the cell, wherein the terrain elevation information comprises a second set of one or more pixels, and wherein each pixel in the second set of pixels indicates an elevation of the terrain at a location in the area around the cell.

12. The network node of claim 11, wherein the processing circuitry is further configured to:
for each of the first and second cells:
receive a set of input parameters for the cell; and
determine the set of features for the cell based on the set of input parameters for the cell.

13. The network node of claim 12, wherein the set of input parameters comprises one or more of:
a cell ID for the cell;

a latitude of an antenna associated with the cell;
a longitude of the antenna;
an altitude of the antenna over an underlying surface;
an azimuth of the antenna;
a mechanical tilt of the antenna;
an electrical tilt of the antenna;
an altitude of the antenna relative to sea level;
a transmit power of the antenna;
a vertical beamwidth of the antenna;
a horizontal beamwidth of the antenna;
a number of transmission antennas at the cell
a reference signal power boost; and
the DL EARFCN.

14. The network node of claim 12, wherein the set of input parameters comprises:
   a clutter type map defining a type of terrain of the coverage area of the cell at each of one or more first locations; and
   an elevation map defining an elevation of the terrain of the coverage area of the cell at each of one or more second locations relative to seal level.

15. The network node of claim 11, wherein to determine a level of similarity between the first and second cells based on the respective sets set of features for the first and second cells, the processing circuitry is configured to determine a similarity matrix indicating how similar the first and second cells are to each other.

16. The network node of claim 15, wherein the processing circuitry is further configured to, for each of the first and second cells, obtain a ranking of one or more other cells in the mobile communications network that are similar to the cell based on a similarity indicator.

17. The network node of claim 16, wherein to obtain a ranking of similar cells, the processing circuitry is further configured to:
   sort each cell in the mobile communications network in order of its similarity indicator; and
   group one or more cells into a group comprising at least one of the first and second cells based on the respective similarity indicators.

18. A non-transitory computer-readable medium storing computer program code thereon that, when executed by processing circuitry of a network node configured to quantify similarities between first and second cells in a mobile communications network, causes the network node to:
   for each of the first cell and the second cell, determine respective sets of features defining a cell configuration and a coverage area morphology for the cell; and
   determine a level of similarity between the first and second cells based on the respective sets set of features for the first and second cells; and
   wherein for each of the first and second cells, the set of features defining the cell configuration of the cell comprises cell and antenna parameters, wherein:
      the cell parameters comprise one or more of:
         a reference signal power boost;
         a DL bandwidth; and
         a Downlink (DL) Evolved Universal Terrestrial Radio Access Absolute Radio Frequency Channel Number (EARFCN);
      the antenna parameters comprise one or more of:
         a mechanical tilt of the antenna;
         a electrical tilt of the antenna;
         a vertical beamwidth of the antenna;
         a horizontal beamwidth of the antenna;
         an antenna height relative to an underlying surface;
         a transmit power of the antenna; and
         a number of transmission antennas; and
   wherein for each of the first and second cells, the set of features defining the coverage area morphology of the cell comprises:
      clutter information for an area around the cell, wherein the clutter information comprises a first set of one or more pixels, and wherein each pixel in the first set of pixels indicates a type of terrain at a location in the area around the cell; and
      terrain elevation information for the area around the cell, wherein the terrain elevation information comprises a second set of one or more pixels, and wherein each pixel in the second set of pixels indicates an elevation of the terrain at a location in the area around the cell.

* * * * *